(12) United States Patent
Aitharaju et al.

(10) Patent No.: US 11,267,514 B2
(45) Date of Patent: Mar. 8, 2022

(54) TRANSPARENT VEHICLE A-PILLAR

(71) Applicant: GM GLOBAL TECHNOLOGY OPERATIONS LLC, Detroit, MI (US)

(72) Inventors: Venkateshwar R. Aitharaju, Troy, MI (US); Bradley A. Newcomb, Troy, MI (US); Xiasong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 16/696,603

(22) Filed: Nov. 26, 2019

(65) Prior Publication Data
US 2021/0155293 A1 May 27, 2021

(51) Int. Cl.
*B62D 25/04* (2006.01)
*B62D 29/04* (2006.01)
*B60J 1/00* (2006.01)

(52) U.S. Cl.
CPC ........... *B62D 25/04* (2013.01); *B62D 29/043* (2013.01); *B60J 1/004* (2013.01)

(58) Field of Classification Search
CPC ......... B62D 25/04; B62D 29/043; B60J 1/004
USPC ..................................................... 296/193.06
See application file for complete search history.

(56) References Cited

U.S. PATENT DOCUMENTS

| 9,227,673 | B2 * | 1/2016 | Berger | ................. B62D 29/001 |
| 10,065,581 | B2 * | 9/2018 | Terada | .................... B60R 13/08 |
| 2019/0225275 | A1 * | 7/2019 | Miura | .................... B62D 25/04 |

* cited by examiner

*Primary Examiner* — D Glenn Dayoan
*Assistant Examiner* — Dana D Ivey
(74) *Attorney, Agent, or Firm* — Cantor Colburn LLP

(57) ABSTRACT

Technical methods described herein include a motor vehicle frame having an improved field of view. The motor vehicle frame includes a pillar body, such as an A-pillar, having an opening positioned between opposite sidewalls of the pillar body. A transparent material is disposed within the opening in the pillar body. The transparent material is selected from materials having a transmission coefficient of at least 50 percent for light in the infrared (IR), visible, and ultraviolet (UV) wavelengths and a refractive index between 1 and 2 for visible light, such as polymethylmethacralate (PMMA) or an optically transparent polycarbonate.

19 Claims, 5 Drawing Sheets

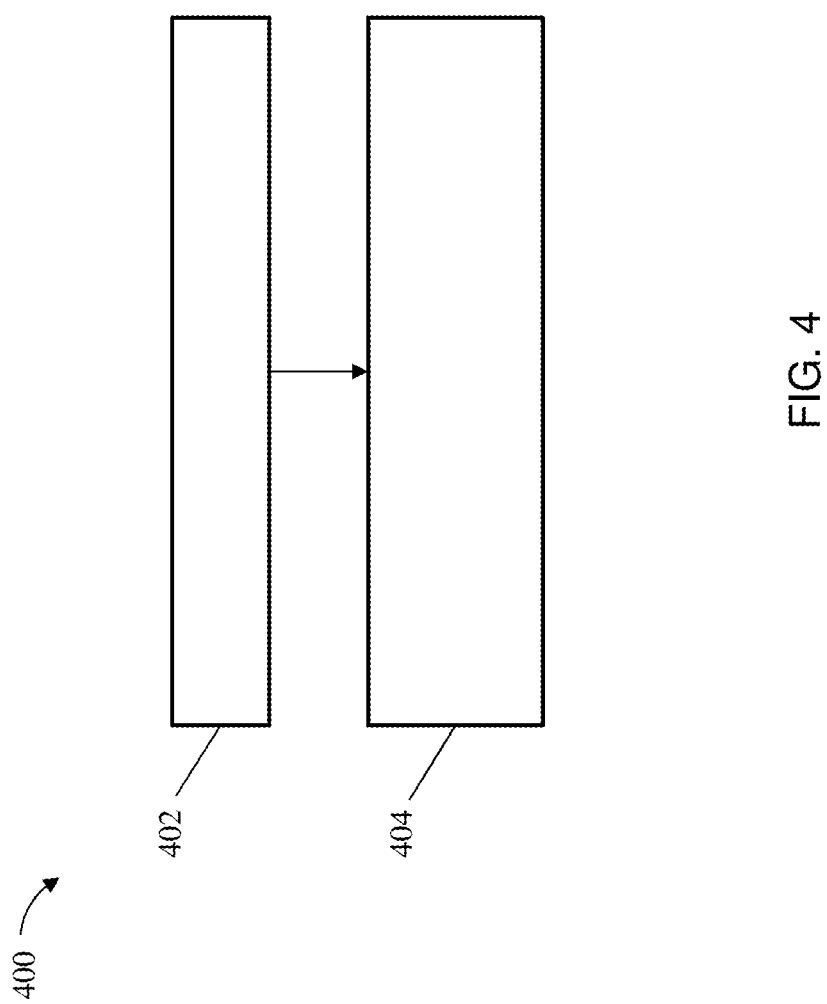

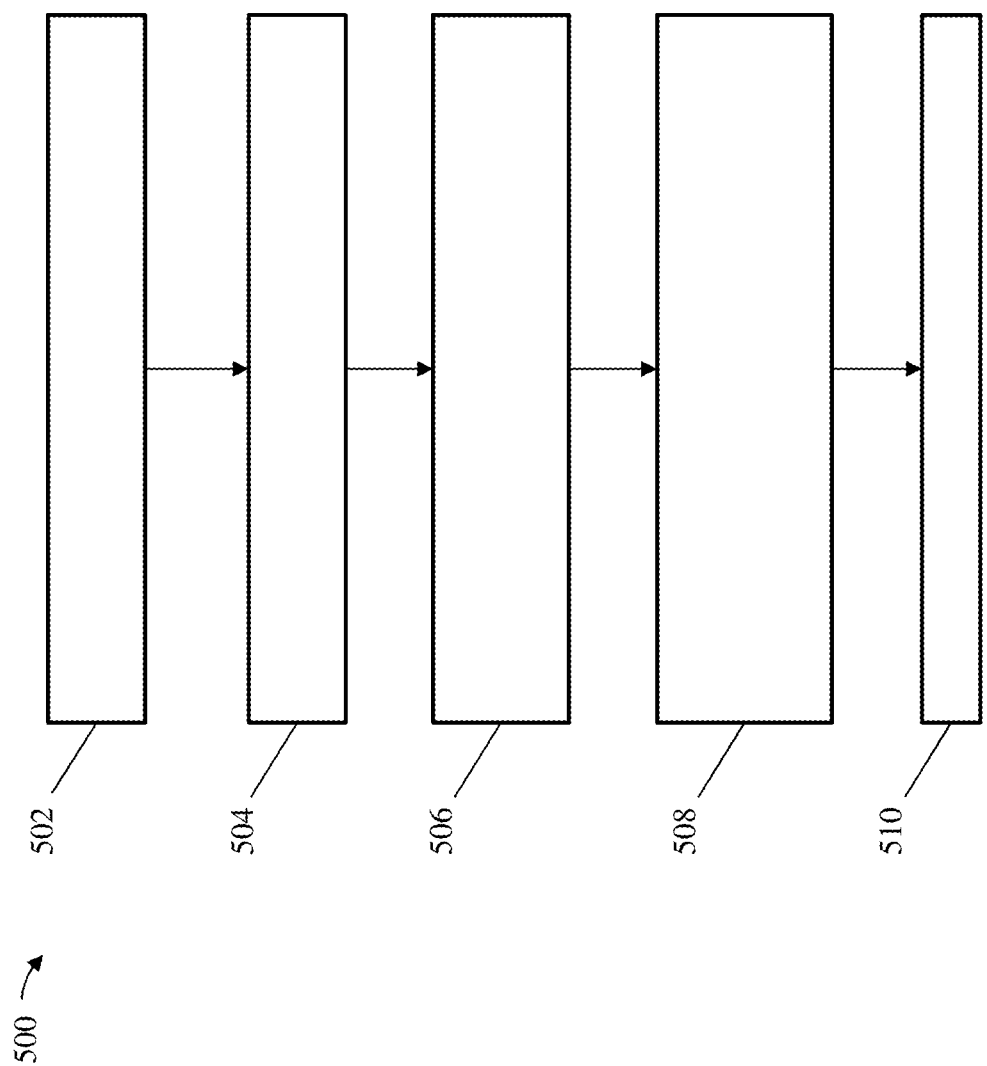

TRANSPARENT VEHICLE A-PILLAR

INTRODUCTION

The present disclosure relates to vehicles having improved driver visibility and, more particularly, to the development and implementation of a transparent vehicle A-pillar.

Improving driver visibility is an important objective for vehicle manufacturers. One known system for improving the visibility of a driver is through an adjustable seating system. Current adjustable seating systems typically allow a user to electronically adjust a variety of seating characteristics through actuation of one or more switches or buttons. These available adjustments typically include the height of the seat base and seat back, the angle of the seat base and seat back, and the distance of the seat from the steering wheel. Through these adjustments, a driver can improve his or her visibility through the front window, to the instrument panel, and to the side view mirrors.

While these seat systems allow drivers of varying statures to adjust the seat and steering wheel to provide adequate visibility through the front window, to the side mirrors, and to the dashboard, they still do not provide a user with adequate visibility to the blind spots hidden by typical vehicle framing, such as the driver's A-pillar. The inability to locate objects that would otherwise be seen, except for the blind spot caused, for example, by the A-pillar structure, can create potential safety concerns for the driver, other drivers, and pedestrians.

Another method used to improve driver visibility is to reduce the physical size of portions of the underlying vehicle frame, for example the A-pillar width. By reducing the width of the various vehicle pillars, the blind spot associated with those pillars can be reduced. Reductions in these pillar widths, however, are constrained in part by structural performance requirements. In other words, arbitrarily small pillar widths are not possible without sacrificing the structural performance of the vehicle frame and negatively impacting passenger safety.

SUMMARY

Technical methods described herein include the manufacture and design of a fiber reinforced vehicle A-pillar having a transparent opening. In one exemplary embodiment a motor vehicle frame having an improved field of view is provided. The motor vehicle frame includes a pillar body having an opening positioned between opposite sidewalls of the pillar body. The motor vehicle frame further includes a transparent material disposed within the opening. The transparent material is selected from materials having a transmission coefficient of at least 50 percent for light in the infrared (IR), visible, and ultraviolet (UV) wavelengths and a refractive index between 1 and 2 for visible light.

In addition to one or more of the features described above, in some embodiments, the transparent material comprises an optically transparent polycarbonate. In some embodiments, the transparent material comprises polymethylmethacralate (PMMA). In some embodiments, the transparent material is impregnated into the opening using injection molding.

In some embodiments, the pillar is an A-pillar of the motor vehicle. In some embodiments, the opening comprises an elliptical opening centered within the A-pillar. In some embodiments, the opening comprises a width of about 40 mm to about 80 mm. In some embodiments, the opening comprises a length of about 200 mm to about 400 mm. In some embodiments, the pillar body comprises a sidewall width around the opening of less than about 75 mm.

In some embodiments, resistance wiring is embedded within the transparent material. In some embodiments, the resistance wiring comprises a watt density of at least 0.5 watts per square inch. The resistance wiring provides defogging and/or deicing for the optically transparent portion. In some embodiments, the embedded resistance wiring provides transparency optimization for the optically transparent portion. In some embodiments, electrical wiring is embedded within the pillar body. The electrical wiring can provide electrical continuity across the opening.

In some embodiments, the pillar body further comprises one or more additional openings vertically or horizontally stacked with the opening.

In another exemplary embodiment a method is provided for forming a motor vehicle frame having an improved field of view. The method can include providing a pillar body having an opening positioned between opposite sidewalls of the pillar body. The method can further include filling the opening with a transparent material. The transparent material is selected to provide a transmission coefficient of at least 50 percent for light in the IR, visible, and UV wavelengths and a refractive index between 1 and 2 for visible light.

In addition to one or more of the features described above, in some embodiments filling the opening with a transparent material comprises injecting the transparent material into the opening at a temperature of about 90 to about 150 degrees Celsius and a pressure of about 1 bar to about 200 bars. In some embodiments, resistance wiring is embedded within the transparent material. The resistance wiring can include a watt density of at least 0.5 watts per square inch.

In yet another exemplary embodiment a method is provided for reinforcing a motor vehicle frame having an improved field of view. The method can include determining a width and a length of an opening in a pillar of the motor vehicle frame. The method can further include determining, based on the width and the length of the opening, principal stresses for the pillar and providing a pillar body having the opening positioned between opposite sidewalls of the pillar body. In some embodiments, the pillar body includes reinforcing fibers arranged into fiber tows contoured around the opening. In some embodiments, the fiber tows are oriented along the principal stresses.

In addition to one or more of the features described above, in some embodiments the reinforcing fibers comprise glass fibers, carbon fibers, or a combination thereof. In some embodiments, providing the pillar body comprises forming an epoxy resin over the fiber tows. In some embodiments, the opening is filled with a transparent material having a transmission coefficient of at least 50 percent for light in the IR, visible, and UV wavelengths and a refractive index between 1 and 2 for visible light.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 depicts a flowchart of an illustrative method according to one or more embodiments; and FIG. 5 depicts a flowchart of an illustrative method according to one or more embodiments.

DETAILED DESCRIPTION

Figure 1:
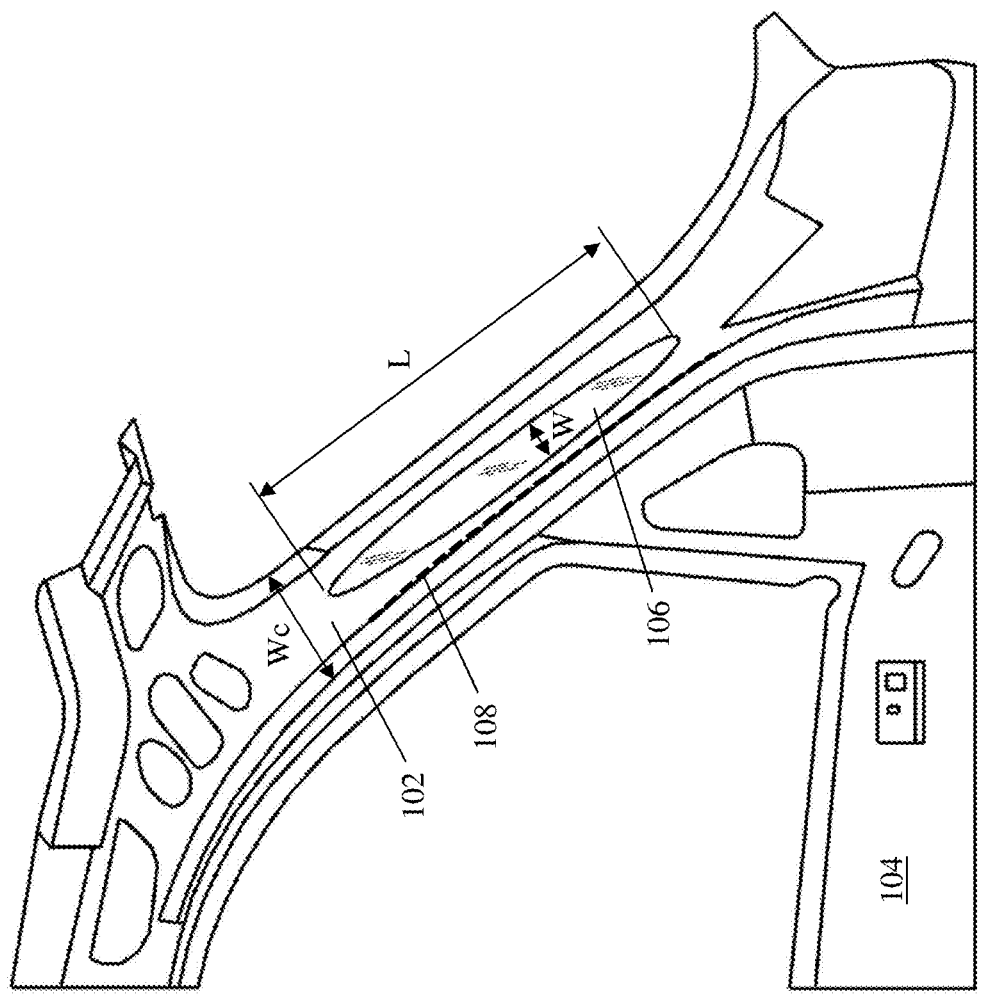
FIG. 1 depicts a fiber reinforced composite vehicle frame having a transparent opening according to one or more embodiments.

The following description is merely illustrative in nature and is not intended to limit the present disclosure, its application, or uses. It should be understood that throughout the drawings, corresponding reference numerals indicate like or corresponding parts and features.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Described herein is a novel fiber reinforced composite A-pillar that includes one or more designed openings impregnated with a transparent resin or composite. The transparent opening is designed to maximize the occupant's field of view, especially on left hand turns, within structural constraints. Transparency is optimized by embedding electrical wiring within the transparent resin or composite opening(s). The electrical wiring allows for the opening material temperature to be adjusted to achieve the required transparency (composite transparency is temperature dependent), and can provide additional functions, such as defogging and deicing. The electrical wiring is embedded during pillar molding to reduce assembly cost. Assembly cost can be further reduced by embedding electrical wiring in the vehicle frame, easing electrical integration.

Structural performance is achieved by topology optimization and 3D tailored fiber placement. In other words, a fiber-reinforced composite frame is provided that leverages strategic fiber placement around the opening to meet required structural performance metrics. For example, computer aided engineering (CAE) simulations can be used to determine load paths. The fibers can then be oriented along the principal stresses to maximize the strength of the fiber-reinforced composite frame.

Advantageously, a fiber reinforced composite pillar having a transparent opening as described herein substantially improves driver visibility without requiring reductions in the physical size of the underlying vehicle frame, unlike conventional approaches. In fact, driver visibility can be improved even when increasing the width of the pillar. For example, a conventional 4" pillar obstructs a greater continuous field of view than a 7" pillar having a 2" transparent opening (i.e., 2.5" sidewalls with a 2" transparent center).

A fiber reinforced composite vehicle frame in accordance with an aspect of an exemplary embodiment is indicated generally as 100 in FIG. 1. The vehicle frame 100 is shown as a frame for a passenger vehicle, such as a car or truck. It is to be understood, however, that the vehicle frame 100 may take on various forms including automobiles, commercial transports, marine vehicles, and the like. It should be further appreciated that while FIG. 1 depicts a possible vehicle frame 100 showing the general components of a vehicle frame and the manner in which those components may be interrelated, the illustrated frame is merely an example, and the disclosed principles herein do not require that the vehicle frame 100 be configured precisely as shown.

In some embodiments, the vehicle frame 100 includes an A-pillar body 102 and a door 104. As described previously herein, the A-pillar body 102 can include an optically transparent portion 106. As used herein, an "optically transparent" region refers to an opening having a transmission coefficient of at least 50% for light with energies in the infrared (IR), visible and ultraviolet (UV) wavelength ranges and a refractive index between 1 and 2 for visible light. In other words, an optically transparent opening is a clear opening. For example, an "optically transparent" region can include a transparency of about 50% to 100%.

In some embodiments, the optically transparent portion 106 is formed by impregnating an opening in the A-pillar body 102 with a transparent resin or a transparent composite material. In some embodiments, the A-pillar body 102 is impregnated with an optically transparent polycarbonate. In some embodiments, the A-pillar body 102 is impregnated with polymethylmethacralate (PMMA). While the optically transparent portion 106 is shown and described with respect to the A-pillar body 102, it is understood that other pillars (e.g., the B-pillar, D-pillar, etc.) can be similarly modified with transparent portions.

Visible light transparency diminishes as a function of the refractive index of the transparent resin or transparent composite material. For example, a refractive index of 1 corresponds to a transparency of 100 percent, while a refractive index of 2.0 corresponds to a transparency of 88.9 percent. The refractive index for glass is 1.5, while the refractive index for water is 1.33. Table 1 depicts the transparency of a resin or composite material over a range of refractive indices.

TABLE 1

| Refractive Index and Transparency (%) | |
|---|---|
| Refractive Index | Transparency (%) |
| 1.0 | 100 |
| 1.1 | 99.3 |
| 1.2 | 99.2 |
| 1.3 | 98.3 |
| 1.4 | 97.2 |
| 1.5 | 96.0 |
| 1.6 | 94.7 |
| 1.7 | 93.3 |
| 1.8 | 91.8 |
| 1.9 | 90.4 |
| 2.0 | 88.9 |

As shown in TABLE 1, the transparency of a resin or composite material will vary due to differences in the refractive index of each respective material. In some embodiments, the transparent resin or transparent composite material is selected such that the refractive index is between 1 and 2. For example, polycarbonate has a refractive index of about 1.6. PMMA has a refractive index of about 1.5.

In some embodiments, the transparent resin or a transparent composite material is formed using a molding process at a temperature between about 90 to about 150 degrees Celsius. In some embodiments, the A-pillar body 102 is manufactured with an opening and the transparent resin or a transparent composite material is injected into the opening to define the optically transparent portion 106. In some embodiments, injection pressures vary from about 1 bar to about 200 bars, depending on the desired throughput.

As shown in FIG. 1, the optically transparent portion 106 includes a length L and a width W. The optically transparent portion 106 further includes a thickness (not shown). The dimensions of the optically transparent portion 106 can be designed to maximize driver visibility, within the allowable constraints of the vehicle frame 100 (strength, crush resistance, etc.). In other words, the maximum length L of the optically transparent portion 106 is limited by the available length of the A-pillar body 102. Similarly, the maximum width W of the optically transparent portion 106 is limited by the available width of the A-pillar body 102 (while further allowing for placement of the reinforcing fiber 302, shown in FIG. 3). In some embodiments, the total width of the A-pillar body 102 is 50 mm to 180 mm (or about 2 inches to about 7 inches), although other widths are within the contemplated scope of the disclosure.

As shown in FIG. 1, increasing the value of W relative to the width of the A-pillar body 102 will increase the portion of the A-pillar body 102 that is filled with transparent resin, decreasing the structural performance of the A-pillar body 102 relative to a base steel or aluminum frame. Conversely, reducing W limits the field of view benefit afforded by the optically transparent portion 106. Consequently, a balance must be struck whereby W is large enough to provide a field of view benefit, but small enough to allow for the A-pillar body 102 to satisfy structural requirements.

In some embodiments, the width W of the optically transparent portion 106 ranges from about 40 mm to 80 mm, or about 1.5 inches to 4.0 inches, although other widths are within the contemplated scope of the disclosure. In some embodiments, W is about 2 to about 3 inches for an A-pillar body 102 having a width of about 4 to about 5 inches.

In some embodiments, the maximum W dimension is limited by safety performance metrics, such as minimum compression and tension requirements during rollover tests. In some embodiments, the maximum W dimension is about 80% the width of the A-pillar body 102, although other widths are within the contemplated scope of the disclosure.

Advantageously, the total width W of the A-pillar body 102 can be increased relative to conventional frames while still providing a superior field of view. To illustrate, consider a conventional 4-inch A-pillar and a 7-inch A-pillar having a 3-inch transparent region formed according to one or more embodiments (e.g., a 3-inch transparent region centered between two 2-inch pillar sidewalls). The 4-inch A-pillar, while smaller, will obstruct a continuous field of view of about 4 inches. Conversely, the 7-inch A-pillar will obstruct two continuous fields of view of about 2 inches each. In other words, having a transparent region in the A-pillar provides an opportunity to widen the A-pillar while still providing a superior field of view as compared to conventional frames.

In some embodiments, the length L of the optically transparent portion 106 ranges from about 50 mm to 400 mm, or about 2 inches to 16 inches, although other lengths are within the contemplated scope of the disclosure. In some embodiments, the length L is constrained by the structural performance load case of a roof crush.

As shown in FIG. 1, increasing the value of L relative to the length of the A-pillar body 102 will increase the portion of the A-pillar body 102 that is filled with transparent resin, decreasing the structural performance of the A-pillar body 102 relative to a base steel or aluminum frame. In other words, as L increases the likelihood of failure (e.g., buckling) during a roof crush test increases proportionately. Conversely, reducing L limits the field of view benefit afforded by the optically transparent portion 106. In a similar manner to optimizing the width W, a balance must be struck whereby L is large enough to provide a field of view benefit, but small enough to allow for the A-pillar body 102 to satisfy structural requirements. In some embodiments, the maximum L dimension is about 80% the length of the A-pillar body 102, although other lengths are within the contemplated scope of the disclosure.

In some embodiments, the thickness of the optically transparent portion 106 is substantially equal to the thickness of the A-pillar body 102 ("substantially equal" meaning within machining and injection limits, such as, for example, within about 5 mm or about 2 mm). In some embodiments, the thickness of the optically transparent portion 106 ranges from about 1 mm to about 5 mm, although other thicknesses are within the contemplated scope of the disclosure.

As shown in FIG. 1 the optically transparent portion 106 can be formed within an elliptical opening in the A-pillar body 102. While elliptical shapes are optimum for in-plane loading, it is understood that transparent openings having any arbitrary shape can be formed in the A-pillar body 102 via, e.g., injection molding. In some embodiments, the optically transparent portion 106 is formed within a square cutout in the A-pillar body 102. While square holes can create stress concentrations, especially at the corners, manufacturing can be simplified.

To meet required structural performance metrics, reinforcing fiber 300 is placed around the optically transparent portion 106 (i.e., along opposite sidewalls of the A-pillar body 102). In some embodiments, the width Wc of the sidewalls of the reinforcing fiber 302 is equal to half the width of the A-pillar body 102 less the width W of the optically transparent portion 106 (i.e., the remaining available width after allowing for the optically transparent portion 106 in the A-pillar body 102). In some embodiments, the width Wc of the reinforcing fiber 302 is less than about 75 mm (about 3 inches), although other widths are within the contemplated scope of the disclosure. In some embodiments, the width Wc of the reinforcing fiber 302 can be less than about 40 mm (about 1.5 inches), for example, 25 mm (about 1 inch). The layout and orientation of the reinforcing fiber 302 is discussed in further detail with respect to FIG. 3.

The reinforcing fiber 302 can be made from known materials, such as, for example, glass fiber, carbon fiber, Kevlar, or a hybrid combination of fibers. In some embodiments, composites are used as the material for the optically transparent portion 106, and the material of the reinforcing fiber is selected to ensure that the refractive index of the reinforcing fiber matches the refractive index of the composites (e.g., polymer matrices). Advantageously, refractive index matching between the reinforcing fiber and polymer matrices maximizes the available field of view.

In some embodiments, electrical wiring 108 is routed around the optically transparent portion 106, providing electrical continuity between opposite ends of the A-pillar body 102 (and to remote regions of the vehicle). The electrical wiring 108 can be used, for example, to transmit the power and signals needed for the vehicle's electrical hardware.

In some embodiments, the electrical wiring 108 is embedded within the A-pillar body 102. For example, if the A-pillar body 102 is formed using carbon fiber, the electrical wiring 108 can be embedded in the carbon fiber prior to encasing the carbon fiber in an epoxy resin (during, e.g., the final curing process). In some embodiments, the A-pillar body 102 is formed using a conductive material, such as carbon fiber, and an insulator is provided over the electrical wiring 108 to prevent electrical shorts. For example, a glass veil (not shown) can be used to insulate electrical wiring 108 in an A-pillar body 102 made of a carbon fiber mesh.

Figure 2:
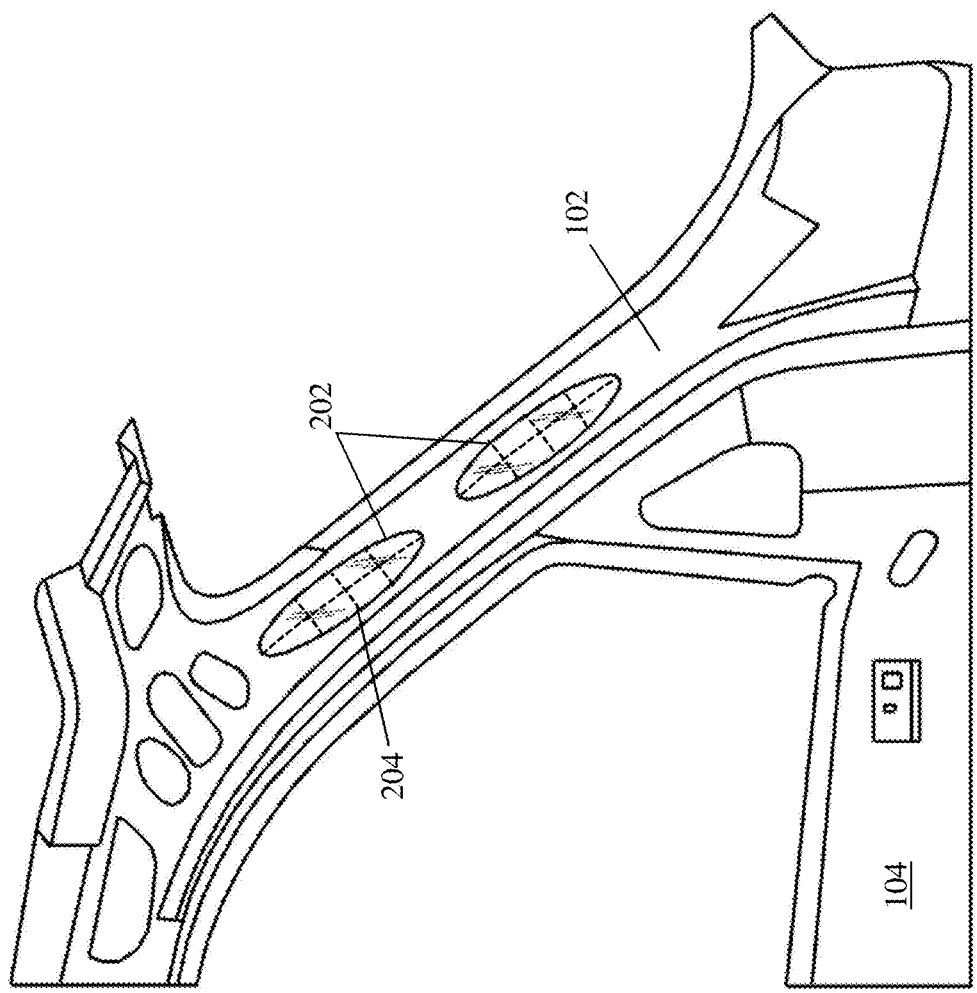
FIG. 2 depicts an alternative fiber reinforced composite vehicle frame having multiple transparent openings according to one or more embodiments.

An alternative fiber reinforced composite vehicle frame in accordance with an aspect of an exemplary embodiment is indicated generally as 200 in FIG. 2. The vehicle frame 200 is shown as a frame for a passenger vehicle, such as a car or truck. It is to be understood, however, that the vehicle frame 200 may take on various forms including automobiles, commercial transports, marine vehicles, and the like. It should be further appreciated that while FIG. 2 depicts a possible vehicle frame 200 showing the general components of a vehicle frame and the manner in which those components may be interrelated, the illustrated frame is merely an example, and the disclosed principles herein do not require that the vehicle frame 200 be configured precisely as shown.

The vehicle frame 200 can include an A-pillar body 102 and a door 104 arranged in a similar manner as in the vehicle frame 100 described with respect to FIG. 1. The vehicle frame 200 depicts an alternative configuration whereby multiple optically transparent portions 202 are formed in the A-pillar body 102, in contrast to the single optically transparent portion 106 in the vehicle frame 100.

As shown in FIG. 2, the multiple optically transparent portions 202 can be arranged as a vertical stack within the A-pillar body 102. While shown as a pair of vertically stacked portions, however, it is understood that other configurations are possible. In other words, the number and orientation of the transparent regions can be adjusted, and these additional arrangements are within the contemplated scope of the disclosure. For example, the multiple optically transparent portions 202 can include more than 2 vertically stacked openings, such as 3, 4, 5, or any other number of vertically stacked openings. In another example, the multiple optically transparent portions 202 can be horizontally arranged (i.e., two thinner transparent regions can be positioned side-by-side). In some embodiments, the length of each opening in a multiple-opening configuration is between 100 mm to 150 mm, although other dimensions are within the contemplated scope of the disclosure.

As further shown in FIG. 2, in some embodiments, resistance wiring 204 can be embedded within the optically transparent portions (e.g., the multiple optically transparent portions 202). The resistance wiring 204 can be embedded during the molding or injection of the optically transparent portions 202 (or the optically transparent portion 106 in the case of a single transparent region). For example, resistance wiring 204 can be placed across the opening(s) in the A-pillar body 102 and resin or composite material can be injected over the resistance wiring 204 to fill the opening(s).

Embedding resistance wiring in the optically transparent portion(s) during pillar molding can reduce assembly cost and provide additional functionality. For example, in some embodiments, the embedded resistance wiring 204 provides defogging and/or deicing for the optically transparent portion(s). In some embodiments, the resistance wiring 204 is arranged in the optically transparent portion(s) to provide a watt density (heat flux) of 0.5 watts per square inch, although other watt densities are within the contemplated scope of the disclosure. In some embodiments, the resistance wiring 204 is arranged uniformly (i.e., in a grid pattern) across the optically transparent portion(s), although other configurations are within the contemplated scope of the disclosure. In some embodiments, the resistance wiring 204 is tungsten wiring. In some embodiments, the tungsten wiring has a diameter of about 12 microns, although other diameters are within the contemplated scope of the disclosure.

In some embodiments, the embedded resistance wiring 204 provides transparency optimization for the optically transparent portion(s). The optical transparency of some composites such as PMMA is temperature dependent. In other words, the transparency of some composite materials can decrease when the temperature falls below an effective limit. To correct this, when composites are used in the optically transparent portion(s), the resistance wiring 204 (e.g., tungsten wiring) is used to adjust the temperature of the optically transparent portion(s) to achieve the required transparency. In some embodiments, the resistance wiring 204 maintains a minimum temperature in the optically transparent portion(s). The minimum temperature can be a threshold temperature needed to achieve a targeted transparency (e.g., 50%, 85%, etc.).

Figure 3:
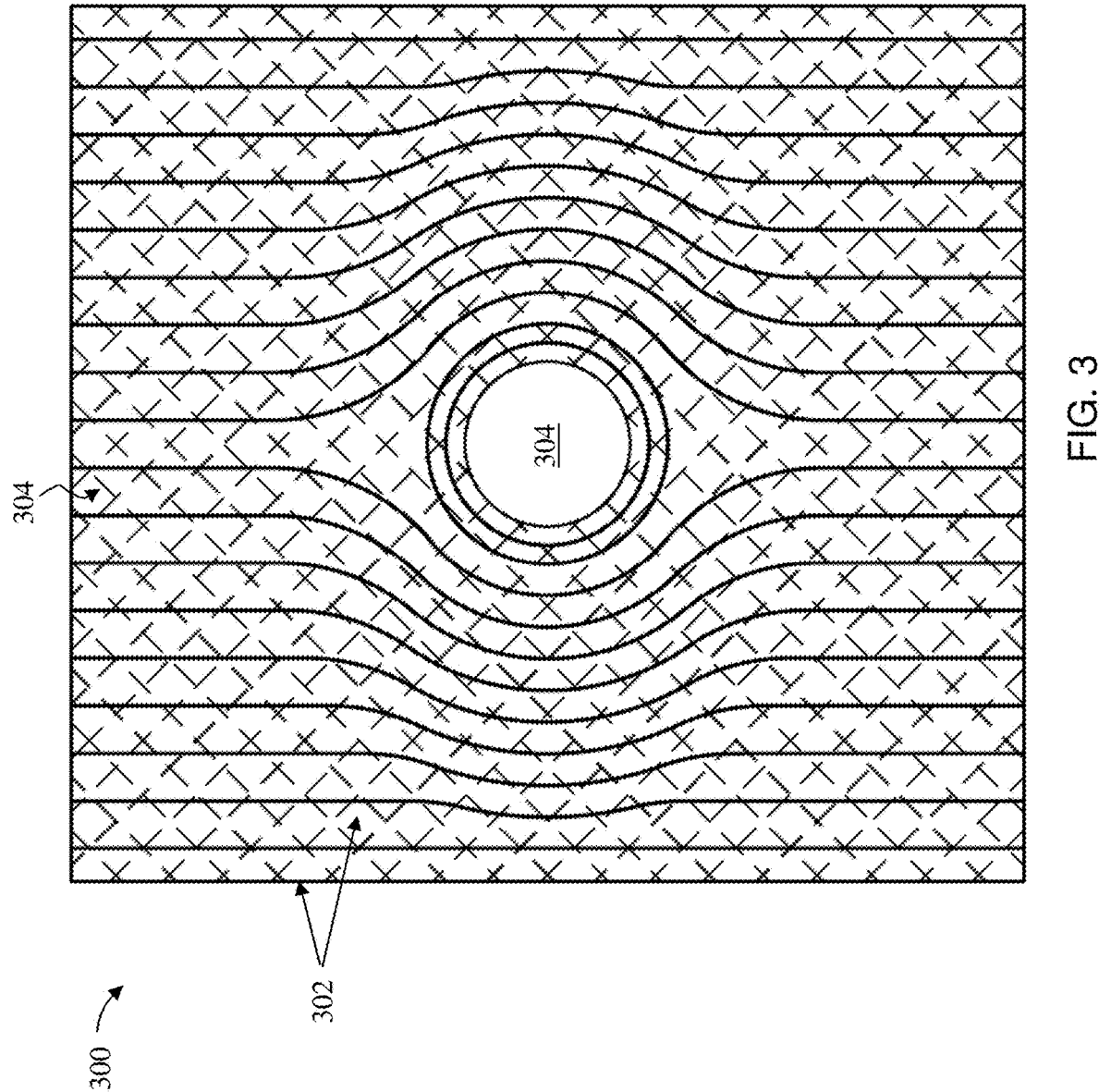
FIG. 3 depicts a layout of reinforcing fibers arranged into fiber tows that are contoured around an opening according to one or more embodiments.

FIG. 3 depicts a layout of reinforcing fiber 300 arranged into fiber tows 302 that are contoured around an opening 304 in accordance with an aspect of an exemplary embodiment. As discussed previously herein, reinforcing fiber 300 can be placed around the optically transparent portion 106 of FIG. 1 or the optically transparent portions 202 of FIG. 2. The reinforcing fiber 300 provides additional strength in the A-pillar body 102, allowing the modified A-pillar body 102 to meet required structural performance metrics.

In some embodiments, the reinforcing fiber 300 is arranged into fiber tows 302 that are contoured around the opening 304 (e.g., a transparent opening in a vehicle pillar) so that stresses are strategically distributed away from the opening 304 (e.g., along opposite sidewalls of the A-pillar body 102 and towards the roof and/or floor of the vehicle).

In some embodiments, known stress simulation tools such as a computer aided engineering (CAE) stress simulation software can be used to model the principal stresses for a desired configuration of the A-pillar body 102 (e.g., total pillar width, transparent opening width, length, etc.). In some embodiments, once the orientation of the principal stresses is known, the reinforcing fiber 300 is arranged into fiber tows 302 oriented along the lines of the known principal stresses. As shown in FIG. 3, for example, the reinforcing fiber 300 is arranged into fiber tows 302 (also known as fiber bundles) corresponding to the principal stresses of the A-pillar body 102. In some embodiments, the fiber tows 302 are bound together into a fiber mesh using stitching 304.

In some embodiments, the reinforcing fiber 300 is encased in a hardening resin (not shown) after positioning the reinforcing fiber 300 along the principal stresses of the A-pillar body 102. In some embodiments, the hardening resin includes an epoxy resin, such as those used to set carbon fibers, although other resins are within the contemplated scope of the disclosure.

FIG. 4 depicts a flow diagram 400 illustrating a method for providing a motor vehicle frame having an improved field of view according to one or more embodiments. As shown at block 802, a pillar body having an opening positioned between opposite sidewalls of the pillar body is provided.

At block 404, the opening is filled with a transparent material. In some embodiments, the transparent material is selected from materials having a transmission coefficient of at least 50 percent for light in the infrared (IR), visible, and ultraviolet (UV) wavelengths.

In some embodiments, filling the opening with a transparent material comprises injecting the transparent material into the opening at a temperature of about 90 to about 150 degrees Celsius and a pressure of about 1 bar to about 200 bars.

In some embodiments, resistance wiring is embedded within the transparent material. In some embodiments, the resistance wiring comprises a watt density of at least 0.5 watts per square inch.

FIG. 5 depicts a flow diagram 500 illustrating a method for reinforcing a motor vehicle frame having an improved field of view according to one or more embodiments. As shown at block 502, a width and a length of an opening in a pillar of the motor vehicle frame is determined.

At block 504, principal stresses for the pillar are determined based on the width and the length of the opening selected in block 502.

At block 506, a pillar body having the opening positioned between opposite sidewalls of the pillar body is provided. In some embodiments, the pillar body comprises reinforcing fibers arranged into fiber tows contoured around the opening. In some embodiments, the fiber tows are oriented along the principal stresses. In some embodiments, the reinforcing fibers comprise glass fibers, carbon fibers, or a combination thereof.

At block 508, the opening is filled with a transparent material. In some embodiments, the transparent material comprises a transmission coefficient of at least 50 percent for light in the IR, visible, and UV wavelengths. At block 510, an epoxy resin is formed over the fiber tows.

The technical methods described herein facilitate improvements to conventional vehicle frames, such as the A-pillar in automobiles. The technical features described herein provide a fiber reinforced vehicle frame having a transparent opening. Advantageously, this partially transparent frame greatly improves driver visibility, especially for left hand turns.

In terms of hardware architecture, portions of the fabrication process (e.g., CAE simulations of principal pillar stresses) can be implemented in part using a computing device that can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally any device for executing software.

The memory can include any one or combination of volatile memory elements (e.g., random access memory (RAM, such as DRAM, SRAM, SDRAM, VRAM, etc.)) and/or nonvolatile memory elements (e.g., ROM, hard drive, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

One should note that FIGS. 4 and 5 show functionality that can be implemented in part using software (e.g., determining or modeling principal stresses in a vehicle pillar). In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to illustrative embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A motor vehicle frame having an improved field of view, the motor vehicle frame comprising:
    a pillar body having an opening positioned between opposite sidewalls of the pillar body;
    a transparent material disposed within the opening, the transparent material comprising a transmission coefficient of at least 50 percent for light in the infrared (IR), visible, and ultraviolet (UV) wavelengths and a refractive index between 1 and 2 for visible light; and
    resistance wiring embedded within the transparent material, the resistance wiring configured to adjust a temperature of the transparent material to achieve a targeted transparency.

2. The motor vehicle frame of claim 1, wherein the transparent material comprises an optically transparent polycarbonate.

3. The motor vehicle frame of claim 1, wherein the transparent material comprises polymethylmethacralate (PMMA).

4. The motor vehicle frame of claim 1, wherein the transparent material is impregnated into the opening using injection molding.

5. The motor vehicle frame of claim 1, wherein the pillar is an A-pillar of the motor vehicle.

6. The motor vehicle frame of claim 1, wherein the opening comprises an elliptical opening centered within the A-pillar.

7. The motor vehicle frame of claim 1, wherein the resistance wiring comprises a watt density of at least 0.5 watts per square inch.

8. The motor vehicle frame of claim 1 further comprising electrical wiring embedded within the pillar body, the electrical wiring providing electrical continuity across the pillar body.

9. The motor vehicle frame of claim 1, wherein the opening comprises a width of about 40 mm to about 80 mm.

10. The motor vehicle frame of claim 1, wherein the opening comprises a length of about 200 mm to about 400 mm.

11. The motor vehicle frame of claim 1, wherein the pillar body comprises a sidewall width around the opening of less than about 75 mm.

12. The motor vehicle frame of claim 1, wherein the pillar body further comprises one or more additional openings vertically or horizontally stacked with the opening.

13. A method for providing a motor vehicle frame having an improved field of view, the method comprising:
    providing a pillar body having an opening positioned between opposite sidewalls of the pillar body;
    filling the opening with a transparent material, the transparent material comprising a transmission coefficient of at least 50 percent for light in the infrared (IR), visible, and ultraviolet (UV) wavelengths and a refractive index between 1 and 2 for visible light; and
    embedding resistance wiring within the transparent material, the resistance wiring configured to adjust a temperature of the transparent material to achieve a targeted transparency.

14. The method of claim 13, wherein filling the opening with a transparent material comprises injecting the transparent material into the opening at a temperature of about 90 to about 150 degrees Celsius and a pressure of about 1 bar to about 200 bars.

15. The method of claim 13 wherein the resistance wiring comprises a watt density of at least 0.5 watts per square inch.

16. A method for reinforcing a motor vehicle frame having an improved field of view, the method comprising:
    determining a width and a length of an opening in a pillar of the motor vehicle frame;
    determining, based on the width and the length of the opening, principal stresses for the pillar; and
    providing a pillar body having the opening positioned between opposite sidewalls of the pillar body, the pillar body comprising reinforcing fibers arranged into fiber tows contoured around the opening, the fiber tows oriented along the principal stresses, the fiber tows comprising a first fiber tow and a second fiber tow, wherein the first fiber tow is contoured around and in direct contact with a perimeter of the opening, and wherein the second fiber tow is contoured around the second fiber tow.

17. The method of claim 16, wherein the reinforcing fibers comprise glass fibers, carbon fibers, or a combination thereof.

18. The method of claim 16, wherein providing the pillar body comprises forming an epoxy resin over the fiber tows.

19. The method of claim 16 further comprising filling the opening with a transparent material, the transparent material comprising a transmission coefficient of at least 50 percent for light in the infrared (IR), visible, and ultraviolet (UV) wavelengths and a refractive index between 1 and 2 for visible light.

* * * * *